US008807426B1

(12) United States Patent
Dollard

(10) Patent No.: US 8,807,426 B1
(45) Date of Patent: *Aug. 19, 2014

(54) MOBILE COMPUTING DEVICE AUTHENTICATION USING SCANNABLE IMAGES

(71) Applicant: Google Inc., Mountain View, CA (US)

(72) Inventor: Morgan Francois Stephan Dollard, Belmont, CA (US)

(73) Assignee: Google Inc., Mountain View, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/920,240

(22) Filed: Jun. 18, 2013

Related U.S. Application Data

(63) Continuation of application No. 13/235,940, filed on Sep. 19, 2011, now Pat. No. 8,485,438.

(51) Int. Cl.
*G06K 19/00* (2006.01)
*G06F 21/36* (2013.01)

(52) U.S. Cl.
CPC .................................... *G06F 21/36* (2013.01)
USPC ....................... 235/380; 235/375; 235/462.01

(58) Field of Classification Search
USPC .......................................... 235/375, 380, 462
See application file for complete search history.

(56) References Cited

U.S. PATENT DOCUMENTS

| 8,485,438 | B2 * | 7/2013 | Dollard | ......................... 235/380 |
| 2007/0063050 | A1 | 3/2007 | Attia et al. | |
| 2010/0191972 | A1 | 7/2010 | Kiliccote | |
| 2010/0315200 | A1 | 12/2010 | Warrier | |

FOREIGN PATENT DOCUMENTS

| JP | 2008211515 A | 9/2008 |
| JP | 2009075637 A | 4/2009 |
| KR | 20080047730 A | 5/2008 |
| KR | 101051407 B1 | 7/2011 |

OTHER PUBLICATIONS

"AuthTag™ Mobile Authentication" How It Works [online]. [Retrieved May 20, 2011]. Retrieved from the internet: <http://authtag.com/how-it-works>, 2 pages.
Bob Blonchek, AuthTag™ Mobile Authentication and Electronic Prescriptions, © 2011, 2 pages.
Bob Blonchek, Mobile Authentication for Simple and Secure Online Banking AutoTag™ Mobile Authentication, © 2010, 2 pages.
International Search Report and Written Opinion for Application No. PCT/US2012/055738 dated Feb. 27, 2013.

* cited by examiner

*Primary Examiner* — Michael G Lee
*Assistant Examiner* — Matthew Mikels
(74) *Attorney, Agent, or Firm* — Morris & Kamlay LLP

(57) ABSTRACT

User credentials are passed to a mobile computing device using scannable images. A scannable image is generated based on a previously created user profile. A user accesses a website from a computer and, in response, the scannable image is locally displayed on the computer. The mobile computing device may be authenticated by capturing the scannable image that is displayed on the computer. In the event that a user profile stored on the mobile computing device matches the previously created user profile that is encoded in the scannable image, the mobile computing device is authenticated. The user may then directly access data and/or interact with the website using the authenticated mobile computing device.

20 Claims, 4 Drawing Sheets

MOBILE COMPUTING DEVICE AUTHENTICATION USING SCANNABLE IMAGES

CROSS-REFERENCE TO RELATED APPLICATIONS

This application is a continuation of U.S. application Ser. No. 13/235,940, filed on Sep. 19, 2011, the disclosure of which is incorporated herein by reference.

BACKGROUND

The use of mobile computing devices is becoming increasingly commonplace in the workplace resulting in increased productivity due to a mobile workforce. In the event that a mobile computing device is accessed by an unauthorized user, the information contained therein may compromise the security of an organization. Such a security breach commonly arises due to an unauthorized user accessing an unattended, lost or stolen mobile computing device.

User authentication is one way to prevent unauthorized use of a mobile computing device. Authentication is a process by which a user verifies his identity before the computing device can be accessed. One-time passwords or application specific passwords may require a string of characters to authenticate a computing device to a user account. These character strings are usually lengthy and difficult to type using a keyboard or other input mechanism on the mobile computing device.

SUMMARY

Aspects of the present disclosure relate generally to passing user credentials to a mobile computing device using scannable images. In one illustrative example, a user accesses a website from a personal computer. A scannable or otherwise capturable image is generated at the personal computer based on a previously created user profile. The image that is generated is a unique image that contains an embedded set of data that includes user credentials included in the user profile (e.g., a username/password combination, answers to security questions, mobile computing device information, data access permissions/restrictions, etc.). The scannable image may also include encrypted messages and application-specific encryption keys and/or other authentication credentials.

The user may attempt to authenticate his mobile computing device by capturing the image that is displayed on the personal computer. If a user profile stored on the mobile device corresponds to the previously submitted user profile that is encoded in the scannable image, the device is authenticated. The user may then access data and/or interact with the website on the authenticated mobile computing device without entering any additional information on the mobile computing device.

In one aspect, a computer-implemented method includes generating, using a first processor, a scannable image that encodes a first user profile. The scannable image is output to a display of a first computing device. The scannable image is captured at a second computing device. A second user profile is stored at the second computing device. Using a second processor, a determination is made whether the first user profile corresponds to the second user profile. In the event that the first user profile corresponds to the second user profile, the second computing device is authenticated.

In another aspect, a system includes a first computing device and a second computing device. The first computing device is configured to generate a scannable image that encodes a first user profile, and output the scannable image to a display. The second computing device stores a second user profile and is configured to: capture the scannable image; decode the encoded data in the scannable image; and determine, using the decoded data, whether the first user profile corresponds to the second user profile. In the event that the first user profile corresponds to the second user profile, the second computing device is authenticated.

In one aspect, a computer-implemented method for authenticating a mobile computing device includes capturing a scannable image at the mobile computing device using a processor. A first user profile is encoded in the scannable image. Using a processor, the first user profile encoded in the scannable image is decoded, and a determination is made whether the decoded first user profile corresponds to a second user profile. The second user profile is stored in the mobile computing device. In the event that the first user profile corresponds to the second user profile, the mobile computing device is authenticated.

DETAILED DESCRIPTION

The present disclosure is directed to passing user credentials to a mobile computing device using scannable images. In one illustrative example, a user accesses a website from a personal computer. A scannable or otherwise capturable image is generated at the personal computer based on a previously submitted user profile. The scannable image is displayed locally on the personal computer. The scannable image is a unique image that may contain encoded information from the user profile such as a username/password combination, answers to security questions, and data that identifies the user's mobile computing device. The encoded information may also include data permissions/restrictions (e.g., a user may be allowed to access email but not payment information, a user may be able to view an account balance but not initiate wire transfers, a user may make payment transactions that do not exceed a per transaction or daily limit). The image may also include encrypted messages intended for the user or application-specific encryption keys and/or other authentication credentials.

The user may attempt to authenticate his mobile computing device by capturing the image that is displayed on the personal computer. If the user profile stored on the mobile device corresponds to the previously submitted user profile that is encoded in the captured image, the device is authenticated. The authenticated mobile computing device may then be used to access data and/or interact directly with the website without entering any additional information from the mobile computing device. Examples of accessing data using the mobile computing device may include accessing a mobile banking application or an email application.

Figure 1:
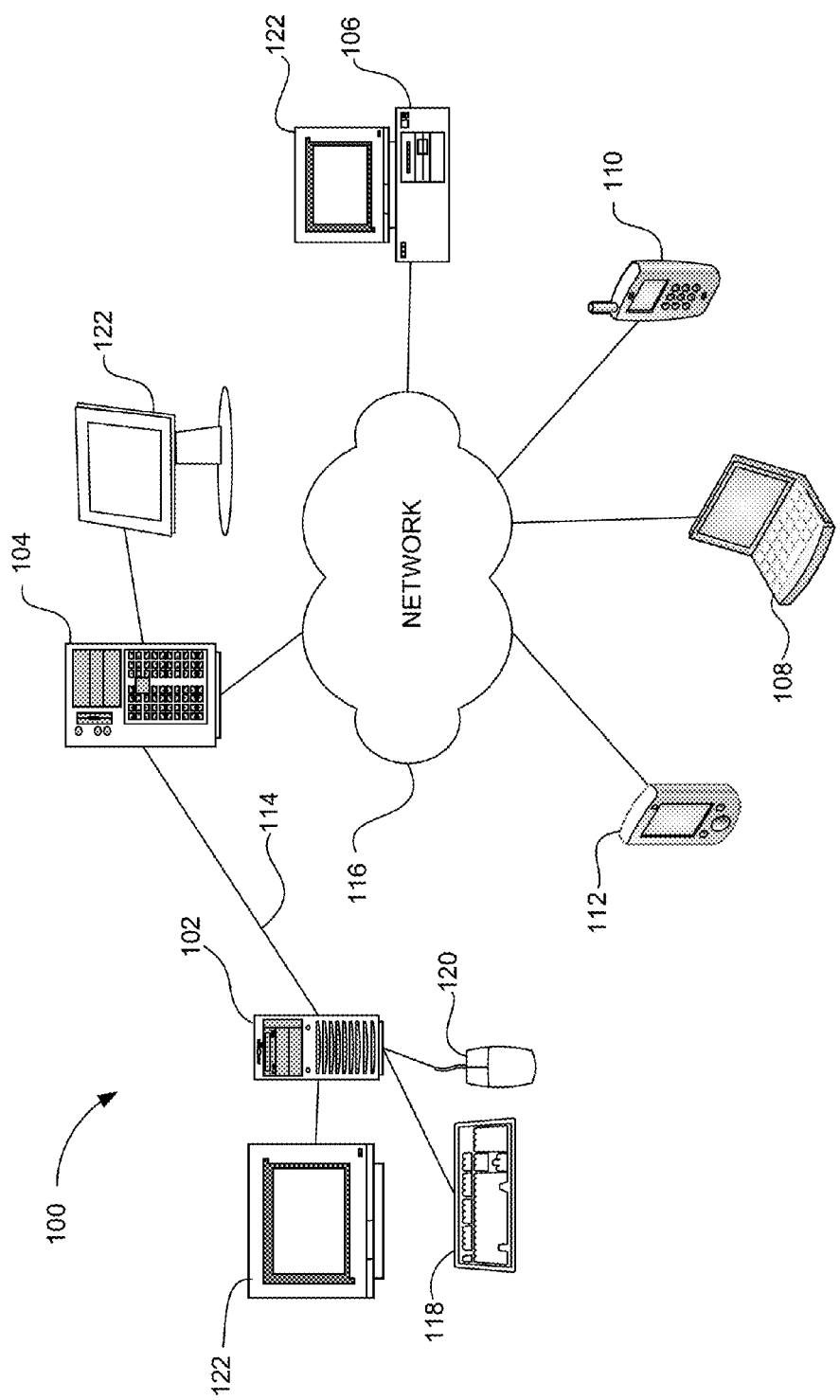
FIG. 1 is a functional diagram of a system in accordance with example embodiments.

FIG. 1 presents a schematic diagram of a computer system depicting various computing devices that can be used alone or in a networked configuration in accordance with aspects of the disclosure. For example, this figure illustrates a computer network 100 having a plurality of computers 102, 104, 106, 108 as well as other types of devices such as mobile computing devices including a mobile phone 110 and a PDA 112. The computers 102, 104, 106, 108 and mobile computing devices 110, 112 may be interconnected via a local or direct connection 114 and/or may be coupled via a network 116 such as a LAN, WAN, the Internet, etc., which may be wired or wireless.

Each device may include, for example, one or more processing devices and have user inputs such as a keyboard 118 and mouse 120 and/or various other types of input devices such as pen-inputs, joysticks, buttons, touch screens, etc., as well as a display 122, which could include, for instance, a CRT, LCD, plasma screen monitor, TV, projector, etc. Each computer 102, 104, 106, 108 may be a personal computer, server, etc. By way of example only, computers 102, 106 may be personal computers while computer 104 may be a server and computer 108 may be a laptop.

Figure 2:
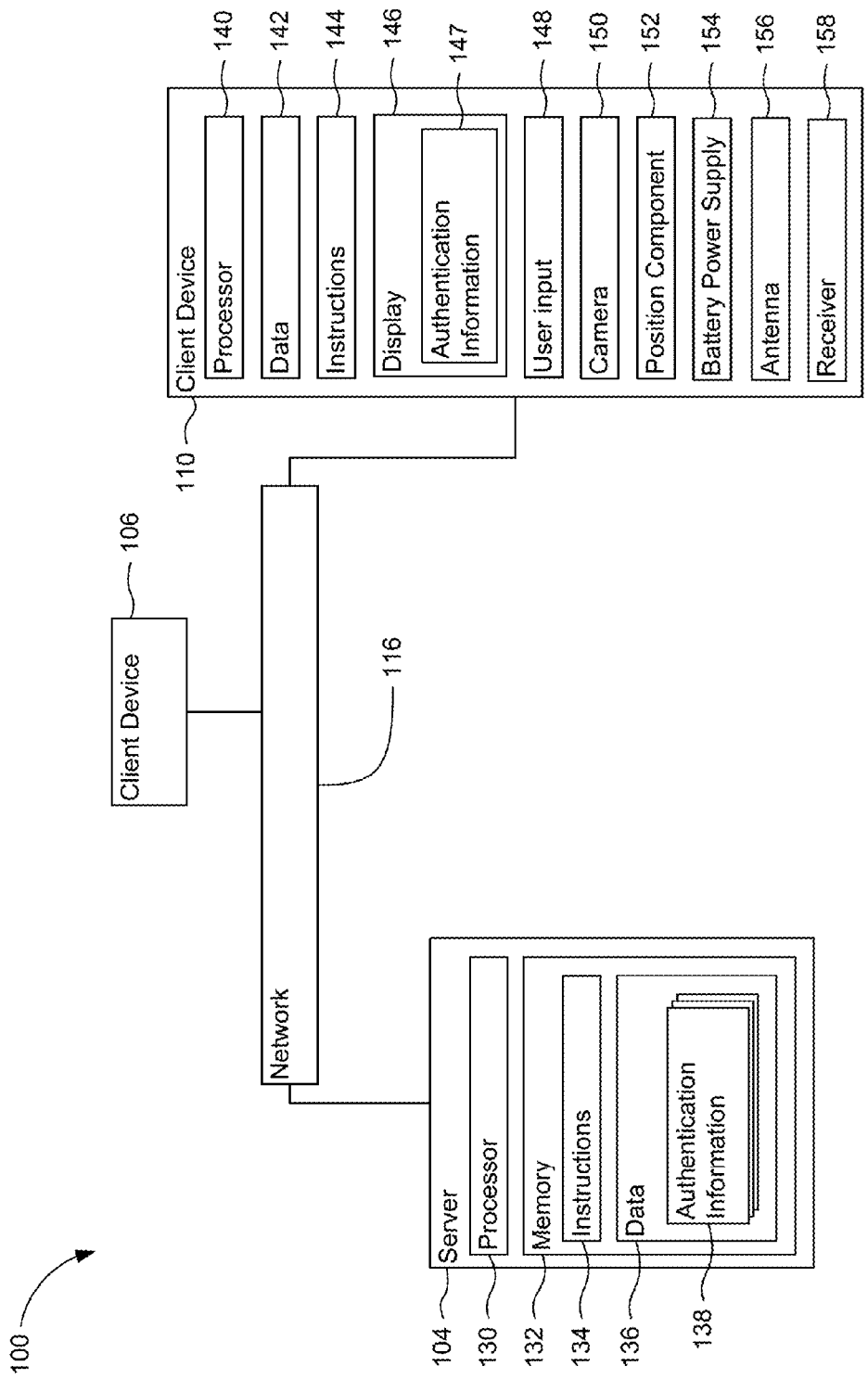
FIG. 2 is a pictorial diagram of the system of FIG. 1.

As shown in FIG. 2, the system 100 in accordance with example embodiments includes the computer 104 contains a processor 130, memory 132 and other components typically present in general purpose computers. The memory 132 stores information accessible by the processor 130, including instructions 134 and data 136 that may be executed or otherwise used by the processor 130. The memory 132 may be of any type capable of storing information accessible by the processor 130, including a computer-readable medium, or other medium that stores data that may be read with the aid of an electronic device, such as a hard-drive, memory card, flash drive, ROM, RAM, DVD or other optical disks, as well as other write-capable and read-only memories. In that regard, the memory 132 may include short term or temporary storage as well as long term or persistent storage. Systems and methods may include different combinations of the foregoing, whereby different portions of the instructions 134 and data 136 are stored on different types of media.

The instructions 134 may be any set of instructions to be executed directly (such as machine code) or indirectly (such as scripts) by the processor 130. For example, the instructions 134 may be stored as computer code on the computer-readable medium. In that regard, the terms "instructions" and "programs" may be used interchangeably herein. The instructions 134 may be stored in object code format for direct processing by the processor 130, or in any other computer language including scripts or collections of independent source code modules that are interpreted on demand or compiled in advance. Functions, methods and routines of the instructions 134 are explained in more detail below.

The data 136 may be retrieved, stored or modified by the processor 130 in accordance with the instructions 134. For instance, although the architecture is not limited by any particular data structure, the data 136 may be stored in computer registers, in a relational database as a table having a plurality of different fields and records, XML documents or flat files. The data 136 may also be formatted in any computer-readable format. By further way of example only, image data may be stored as bitmaps comprised of grids of pixels that are stored in accordance with formats that are compressed or uncompressed, lossless or lossy, and bitmap or vector-based, as well as computer instructions for drawing graphics. The data 136 may comprise any information sufficient to identify the relevant information, such as numbers, descriptive text, proprietary codes, references to data stored in other areas of the same memory or different memories (including other network locations) or information that is used by a function to calculate the relevant data.

The data 136 of the computer 104 may include authentication information 138 that identifies a specific user and the user's mobile computing device. The authentication information may include user credentials, such as a username, a password, an email address and answers to security questions, data access permissions/restrictions, as well as information that uniquely identifies a mobile computing device such as a telephone number or a hash generated by a user profile.

The processor 130 may be any conventional processor, such as a CPU. Alternatively, the processor 130 may be a dedicated controller such as an ASIC. Although FIG. 2 functionally illustrates the processor 130 and memory 132 as being within the same block, it will be understood by those of ordinary skill in the art that the processor 130 and memory 132 may actually comprise multiple processors and memories that may or may not be stored within the same physical housing. For example, the memory 132 may be a hard drive or other storage media located in a server farm of a data center. Accordingly, references to a processor, a computer or a memory will be understood to include references to a collection of processors or computers or memories that may or may not operate in parallel.

The computer 104 may be at one node of a network 116 and capable of directly and indirectly receiving data from other nodes of the network 116. For example, the computer 104 may comprise a web server that is capable of receiving data from client devices 106, 110 via network 116 such that the server 104 uses the network 116 to transmit and display information to a user on display 146 of client device 110. Server 104 may also comprise a plurality of computers that exchange information with different nodes of a network for the purpose of receiving, processing and transmitting data to the client devices 106, 110. In this instance, the client devices 106, 110 will typically still be at different nodes of the network than any of the computers comprising server 104.

The network 116, and intervening nodes between server 104 and client devices 106, 110, may comprise various configurations and use various protocols including the Internet, World Wide Web, intranets, virtual private networks, local Ethernet networks, private networks using communication protocols proprietary to one or more companies, cellular and wireless networks (e.g., Wi-Fi), instant messaging, HTTP and SMTP, and various combinations of the foregoing. Although only a few computers are depicted in FIGS. 1 and 2, it should be appreciated that a typical system can include a large number of connected computers.

The client devices 106, 110 may include an antenna 156 and receiver 158 which may be used to scan the wireless network spectrum and identify local wireless network signals. For example, the antenna 182 may receive "beacon" messages and send them to the receiver 183 which demodulates the information to identify wireless network access points. In one example, these beacon messages may be IEEE 802.11 management frames transmitted by access points to announce themselves to potential wireless network users. These frames may contain Service Set Identifiers ("SSID") information as well as physical layer parameters that assist devices in connecting to the wireless network. The beacon messages may also include additional network access information which also assists devices in accessing the network, including whether the access point is accepting new users, whether the data is encrypted, and which type of authentication is being used, for example, no authentication (open to all), password based, web-portable based, or Media Access Control ("MAC") address based. However, it will be understood that data collected in accordance with this disclosure may be limited to the information discussed above, for example MAC addresses, SSIDs or other identifiers and signal strengths, and need not contain additional information. For example, information contained in the network traffic or payload data, such as personal information, need not be collected, and in fact, may actually be removed in order to protect the privacy of the wireless network's users.

Users may be required to take an affirmative step in order to select or "opt-in" to participate. For example, users may be required to sign in to a service before providing any information and may be provided with an explanation of how and why their feedback is being used. Similarly, users may be provided with the opportunity to cease participation temporarily or permanently at any time. By requiring users to opt-in and sign in for the service, this may also reduce the amount of third parties attempting to spam the system. Over time, the system may determine whether the data provided by some users' devices is consistently at odds with that of other users, and disregard the information provided by inconsistent devices.

Each client device 106 may be configured similarly to the server 104, with a processor, memory and instructions as described above. Each client device 110 may be a mobile computing device intended for use by a person and capable of wirelessly exchanging data, including position information derived from a geographical position component 152, with the server 104 over the network 116 such as the Internet. By way of example only, client device 110 may be a wireless-enabled PDA, a cellular phone, a netbook or a tablet PC capable of obtaining information via the Internet or other network. The user may input information using a small keyboard, a keypad, voice recognition or a touch screen.

The client device 110 has all of the components normally used in connection with a mobile computing device such as a central processing unit (CPU) 140, memory (e.g., RAM and internal hard drives) storing data 142 and instructions 144, an electronic display 146 (e.g., a monitor having a screen), and user input 148 (e.g., a keyboard or touch-screen). In accordance with aspects of the disclosure, the data 142 of the client device 110 may include authentication information 147 that identifies the client device 110 and a user of the client device 110. The authentication information 147 may include user credentials, such as a username, a password, an email address and answers to security questions, data access permissions/restrictions, as well as information that identifies the client device 110 such as a telephone number or a hash generated by a user profile.

The client device 110 may also include an image capturing device (e.g., a camera 150), the geographical position component 152, accelerometer, speakers, a network interface device, a battery power supply 154 or other power source, and all of the components used for connecting these elements to one another.

In addition to the operations described below and illustrated in the figures, various operations in accordance with example embodiments will now be described. It should also be understood that the following operations do not have to be performed in the precise order described below. Rather, various steps can be handled in a different order or simultaneously, and may include additional or fewer operations.

Figure 3:
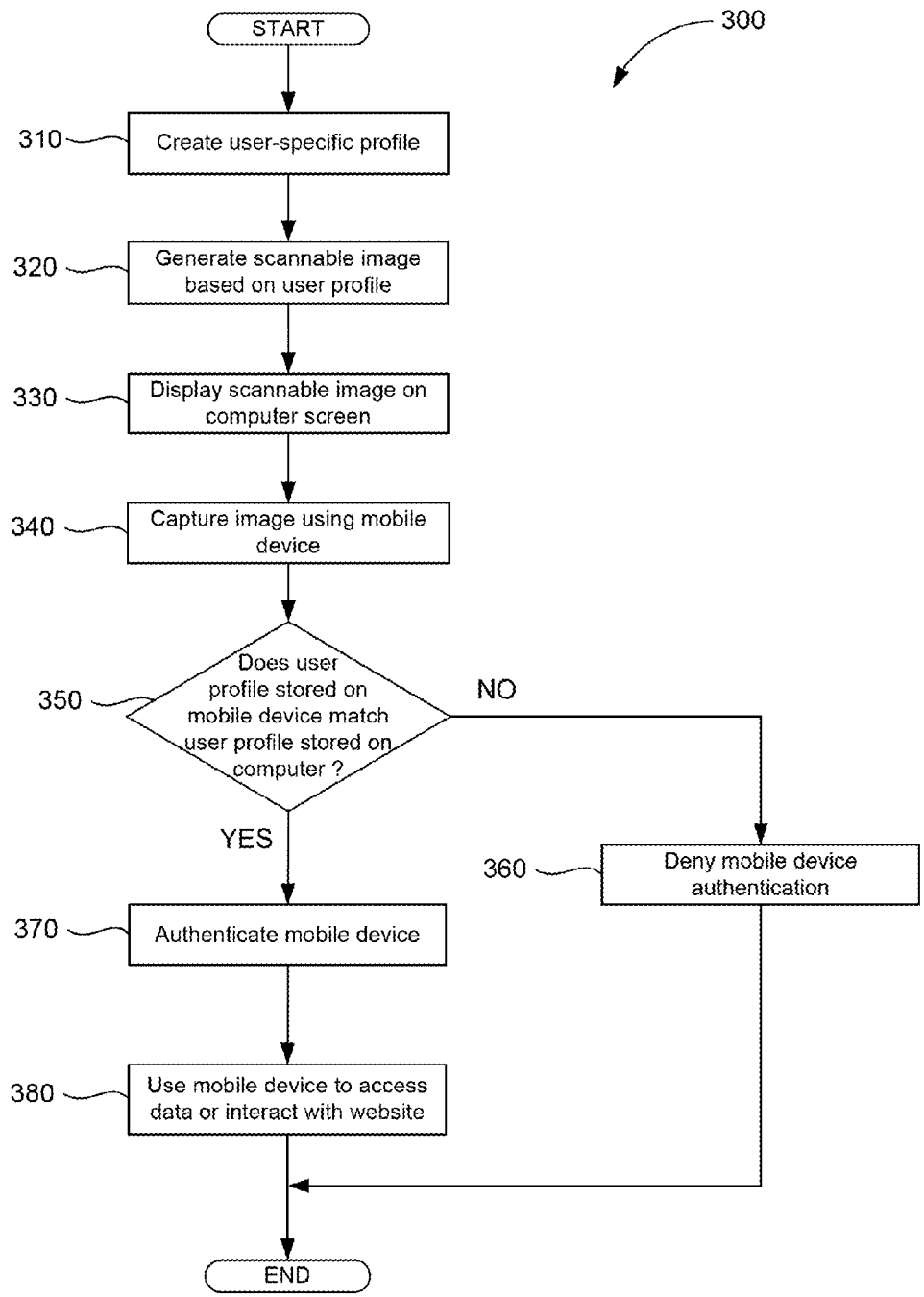
FIG. 3 is a flow diagram in accordance with example embodiments.

FIG. 3 demonstrates a process 300 of authenticating a mobile computing device using capturable images displayed on a different computing device. The authentication process 300 is executed to prove the identity of a user who initiates a transaction by verifying that the mobile computing device actually belongs to the user who is authorized to conduct the transaction. Example transactions that may be conducted on the authenticated mobile device include banking and other financial transactions, communications that include personal health and medical information, exchange of information with a government agency, and any other communication that includes data that should not be shared with or made accessible to unauthorized third parties.

The process 300 begins when a user-specific profile is created (block 310). A user may be prompted to create a profile and register his mobile computing device while interacting with a website where mobile online transactions are commonly performed. The user may be prompted to input personal information such as an email address, a username, a password, answers to security questions, data access permissions/restrictions, etc. The user may also provide information that identifies the user's mobile computing device such as a telephone number, a hash generated by the user profile, or other information that uniquely identifies the mobile computing device. In some embodiments, the user-specific profile may be generated using input provided directly from the mobile computing device. The user profile may be stored on the user's mobile computing device as well as servers that host websites where personal information might be exposed that the user would not want to be accessible by unauthorized third parties. Any given mobile computing device may be associated with multiple sets of user credentials such as a phone-specific profile and several application-specific profiles. Example application-specific accounts include a banking account profile, a social network profile, and a gaming profile.

A scannable image is generated based on the user profile (block 320). The scannable image may be a bar code, a QR code or any other image that may be used to uniquely identify the user and the user's mobile computing device. The scannable image may embed the information provided by the user when the user profile was created. The scannable image may be generated after the user profile is created and before the user accesses data such as by, for example, interacting with a website. Alternatively, the scannable image may be generated after the user accesses the data or interacts with the website. In some embodiments, in the event that the scannable image is generated after the user accesses the data/website, the scannable image may include information that corresponds to the accessed data/website. In other embodiments, the scannable image includes encrypted messages that are generated at the accessed website for the user to decrypt, access and read.

In some embodiments, data access permissions and restrictions are encoded in the scannable image. The scannable image may be generated in response to selection of a subset of privileges to grant a user. Example privileges include: read or read/write access to email data, calendar data, documents, and stored payment information; payment restrictions (e.g., no visual access, transaction limits, balance view, balance transfer, external transfer prevention, etc.); and one-time password generation.

Before the user may use her mobile device to access data or a website where personal or confidential information is exchanged, the user utilizes a different computer to access the same website, and the scannable image is displayed on an output screen of the computer (block 330). The computer where the scannable image is displayed may be any computing device other than the mobile computing device that the user wants to use to access the website or that was used to generate the user-specific profile.

The user utilizes the mobile computing device to be authenticated to capture the scannable image from the display of the computer (block 340). The scannable image may be captured using an image capturing feature of the mobile computing device such as a camera. The scannable image contains information associated with the previously generated user-specific profile. The scannable image may also include encrypted messages intended for the authorized user, application-specific encryption keys, and/or other authentication credentials for applications that access and/or store data (e.g., mobile banking applications, social networking applications, email applications, payment wallet information). The mobile computing device decodes the data embedded in the scannable image. The decoded data is used to determine whether the mobile computing device is authenticated to proceed with accessing the data or conducting the transaction at the website. Specifically, the decoded data is used to determine whether the mobile computing device that captured the scannable image is the same device that is associated with the previously generated user profile.

A determination is made whether the user profile stored on the mobile device corresponds to the user profile that was used to generate the scannable image (block 350). In the event that the mobile device does not correspond to the user profile that was used to generate the scannable image, processing continues to block 360 where authentication of the mobile device is denied because, presumably, an unauthorized user is attempting to access confidential data from the website. In some embodiments, when authentication is denied, a security alarm or other red flag is triggered such that subsequent attempts by the unauthorized user to access the confidential data are thwarted. Processing then terminates without any personal or otherwise sensitive information being exposed to the mobile device. Upon failed authentication of a mobile device, the process may include a step of deleting or denying access to data related to the failed authorization including revocation of any permissions associated with the application and/or device. In the event that the user profile stored on the mobile device corresponds to the user profile that was used to generate the scannable image (as indicated in the decoded data captured from the scannable image), processing continues to block 370 where the mobile device is authenticated.

After the mobile device is authenticated, the corresponding website may be launched on the mobile computing device and the user may access data and/or interact with the website using the mobile computing device to, for example, conduct a transaction and exchange information therewith (block 380). In addition to launching a website, accessing data using the mobile computing device may include executing an application on the mobile computing device. Processing then terminates. Since the mobile computing device is authenticated based on a previously submitted user profile, the transaction that the user engages in with the website is verified and any risk that an unauthorized user has gained access to the user's personal and confidential information is minimized.

Figure 4:
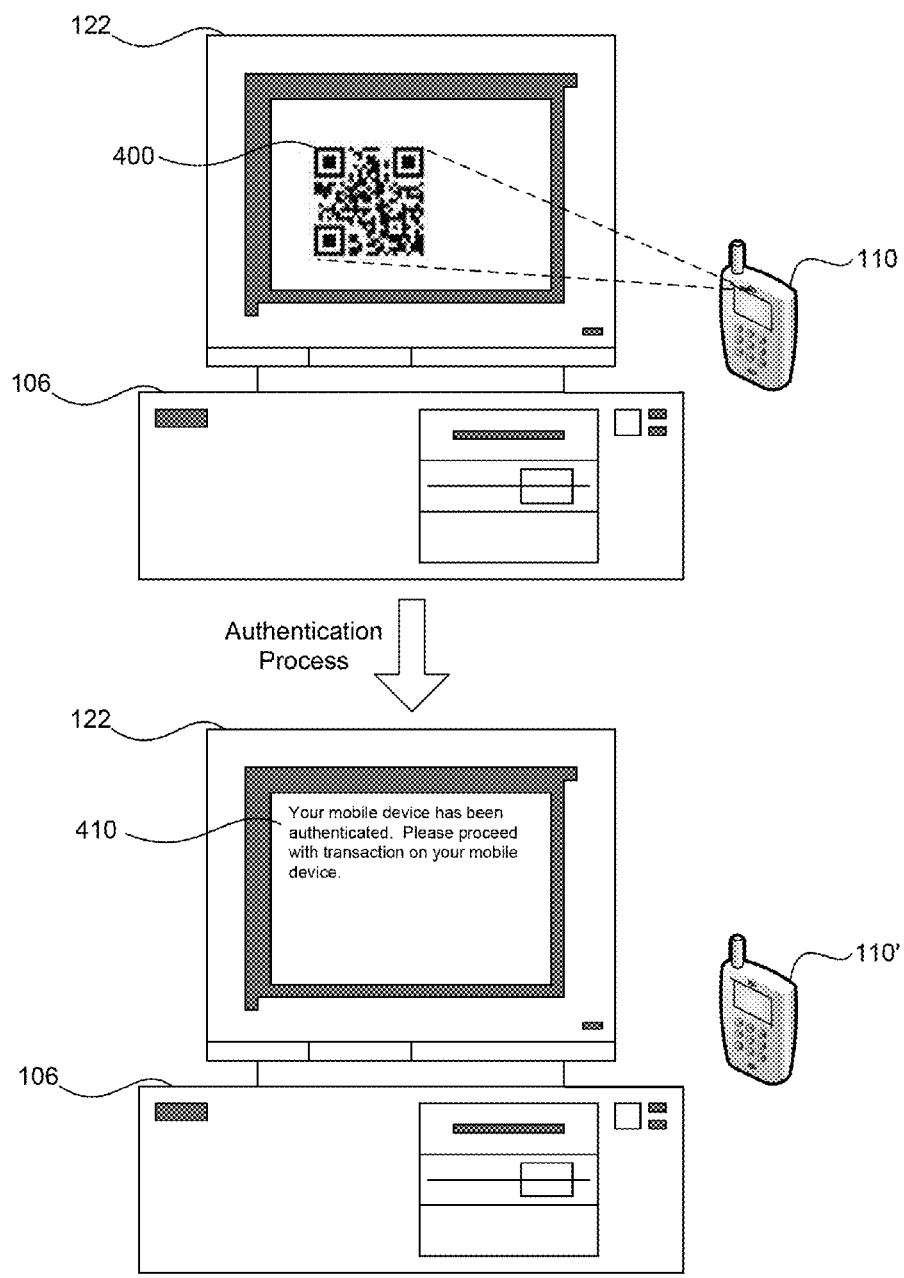
FIG. 4 illustrates authentication of a mobile computing device by capturing a scannable image generated by a different computing device in accordance with example embodiments.

FIG. 4 illustrates authentication of a mobile computing device by capturing a scannable image generated by a different computing device in accordance with example embodiments. FIG. 4 will be described with reference to a user who accesses a bank website on a personal computer to conduct an online banking transaction. However, the disclosure is applicable to the access of any data including, but not limited to, an online transaction conducted from any computing device.

A user initially creates a profile that is used to subsequently authenticate the user's mobile computing device 110. The profile may include user credentials that identify the user and other information that identifies the user's mobile computing device. The user credentials may include a username/password combination, an email address and answers to security questions. The mobile computing device identifying information may include a telephone number, a hash generated by the user profile for the purpose of device authentication, or other information that uniquely identifies the mobile computing device 110. The user profile is stored on the mobile computing device 110 and a server that hosts a subsequently accessed website.

After the user profile is created, the user may access a bank website from a personal computer 106. In some embodiments, before the website allows the user to access any of the user's personal or financial information, a scannable image 400 is generated that includes encoded information based on the user's profile. In other embodiments, the scannable image 400 is generated before the user accesses the website. The scannable image 400 is then displayed on a display 122 coupled to the personal computer 106.

The user may capture the scannable image 400 using her mobile computing device 110. For example, the scannable image 400 may be captured using a camera feature on the mobile computing device 110. The mobile computing device 110 decodes the data that is encoded in the scannable image 400. A determination is then made whether the user profile data that is decoded from the captured image matches the user profile that is stored on the mobile computing device 110. In the event that the user profile encoded in the captured image does not match the user profile stored on the mobile computing device 110, the mobile computing device 110 is not authenticated. In this case, the user cannot conduct a banking transaction on the mobile computing device 110.

In the event that the two user profiles match, the mobile computing device 110' is authenticated, and the online banking transaction may be completed on the authenticated mobile computing device 110'. In this case, an authentication message 410 may be displayed on the display 122 of the personal computer 106 informing the user that the mobile device has been authenticated.

As described above, user credentials are passed to a mobile computing device using scannable images. A user accesses a website from a computing device such as a personal computer. A scannable image is generated based on a previously created user profile. The image that is generated is a unique image that contains an embedded set of data retrieved from the previously created user profile such as user credentials, login information and an authentication password. The image may also include encrypted messages, application-specific encryption keys, and/or other authentication credentials. The scannable image is then displayed locally on the personal computer. The user may attempt to authenticate his mobile computing device by capturing the image that is displayed on the personal computer. If a user profile stored on the mobile computing device matches the previously submitted user profile that is encoded in the captured image, the mobile device is authenticated. The user may then access data and/or directly interact with the website using the authenticated mobile computing device.

As these and other variations and combinations of the features discussed above can be utilized without departing from the scope of the claims, the foregoing description of exemplary embodiments should be taken by way of illustration rather than by way of limitation as defined by the claims. It will also be understood that the provision of example embodiments (as well as clauses phrased as "such as," "e.g.", "including" and the like) should not be interpreted as being limited to the specific examples; rather, the examples are intended to illustrate only some of many possible aspects.

The invention claimed is:

1. A method, comprising:
   receiving, at a computing device, a scannable image including encoded data associated with a first user profile, the computing device having a second user profile stored thereon;
   comparing, using a processor, the encoded data associated with the first user profile with data associated with the second user profile, wherein the encoded data is decodable from the scannable image; and
   based on the comparison, when the first user profile corresponds to the second user profile, authenticating the computing device to exchange information with a website, wherein the authenticated computing device is configured to communicate with the website.

2. The method of claim 1, wherein the scannable image is a bar code.

3. The method of claim 1, wherein the scannable image is a QR code.

4. The method of claim 1, wherein the encoded data comprises at least one of: a username, a password, an answer to a security question, information identifying the second computing device, an email address, data identifying the second computing device, data access permissions, data access restrictions, and data associated with the website that is accessed by the computing device.

5. The method of claim 1, wherein the computing device is a mobile computing device.

6. The method of claim 1, wherein at least one of a message and an encryption key is encoded in the scannable image.

7. The method of claim 1, wherein receiving the scannable image comprises using a camera of the computing device to capture the scannable image.

8. The method of claim 1, wherein the exchange of information includes data related to a transaction conducted with the website.

9. The method of claim 1, further comprising:
   decoding, using the processor, the encoded data in the scannable image, wherein the decoded data is used to determine whether the first user profile corresponds to the second user profile.

10. A storage device, comprising instructions that, when executed by a processor, cause the processor to perform a method, the method comprising:
    receiving, at a computing device, a scannable image including encoded data associated with a first user profile, the computing device having a second user profile stored thereon;
    comparing, using the processor, the encoded data associated with the first user profile with data associated with the second user profile, wherein the encoded data is decodable from the scannable image; and
    based on the comparison, when the first user profile corresponds to the second user profile, authenticating the computing device to exchange information with a website, wherein the authenticated computing device is configured to communicate with the website.

11. The storage device of claim 9, wherein the scannable image is a bar code.

12. The storage device of claim 9, wherein the scannable image is a QR code.

13. A system, comprising:
    a computing device including a memory configure to store one or more user profiles, the computing device being configured to:
    receive a scannable image including encoded data associated with a first user profile;
    compare the encoded data associated with the first user profile with data associated with a second user profile of the one or more user profiles, wherein the encoded data is decodable from the scannable image; and
    based on the comparison, when the first user profile corresponds to the second user profile, authenticate the computing device to exchange information with a website, wherein the authenticated computing device is configured to communicate with the website.

14. The system of claim 13, wherein the scannable image is a bar code.

15. The system of claim 13, wherein the scannable image is a QR code.

16. The system of claim 13, wherein the encoded data comprises at least one of: a username, a password, an answer to a security question, information identifying the second computing device, an email address, data identifying the second computing device, data access permissions, data access restrictions, and data associated with the website that is accessed by the computing device.

17. The system of claim 13, wherein the computing device is a mobile computing device.

18. The system of claim 13, wherein at least one of a message and an encryption key is encoded in the scannable image.

19. The system of claim 13, further comprising a camera, wherein to receive the scannable image the camera is configured to capture the scannable image.

20. The system of claim 13, wherein the exchange information includes data related to a transaction conducted with the website.

* * * * *